(12) United States Patent
Laudet et al.

(10) Patent No.: US 7,744,678 B2
(45) Date of Patent: Jun. 29, 2010

(54) POWDERED LIME COMPOSITION, METHOD OF PREPARING SAME AND USE THEREOF

(75) Inventors: Alain Laudet, Namur (BE); Amandine Gambin, Ternuay (FR)

(73) Assignee: S.A. Lhoist Recherche et Developpement (BE)

( * ) Notice: Subject to any disclaimer, the term of this patent is extended or adjusted under 35 U.S.C. 154(b) by 220 days.

(21) Appl. No.: 11/922,167

(22) PCT Filed: Jun. 26, 2006

(86) PCT No.: PCT/EP2006/063542

§ 371 (c)(1),
(2), (4) Date: Dec. 13, 2007

(87) PCT Pub. No.: WO2007/000433

PCT Pub. Date: Jan. 4, 2007

(65) Prior Publication Data

US 2009/0229462 A1    Sep. 17, 2009

(30) Foreign Application Priority Data

Jun. 28, 2005    (BE) .................... 2005/0328

(51) Int. Cl.
*C01F 11/02* (2006.01)
*B01J 20/04* (2006.01)
*B01D 53/50* (2006.01)
*B01D 53/68* (2006.01)

(52) U.S. Cl. ............... 95/137; 423/240 S; 423/244.01; 423/640; 502/400

(58) Field of Classification Search ............ 96/108, 96/153; 95/131, 132, 135–137; 423/240 S, 423/244.01, 635, 640; 502/400, 517
See application file for complete search history.

(56) References Cited

U.S. PATENT DOCUMENTS

| | | | | |
|---|---|---|---|---|
| 4,273,750 A | * | 6/1981 | Hollett et al. | 423/244.01 |
| 4,997,803 A | | 3/1991 | Van der Smissen et al. | |
| 5,030,610 A | * | 7/1991 | Sakata et al. | 502/400 |
| 5,306,475 A | * | 4/1994 | Fichtel et al. | 423/210 |
| 5,310,498 A | * | 5/1994 | Lee et al. | 252/189 |
| 5,492,685 A | * | 2/1996 | Moran et al. | 423/244.07 |
| 6,322,769 B1 | * | 11/2001 | Langelin et al. | 423/635 |
| 7,141,093 B2 | * | 11/2006 | Charette | 95/107 |

FOREIGN PATENT DOCUMENTS

| | | |
|---|---|---|
| DE | 3826971 | 8/1988 |
| EP | 327 902 | 1/1989 |
| EP | 367 148 | 10/1989 |
| EP | 0 795 350 | 3/1997 |
| JP | 10139501 A | 5/1998 |
| RU | 2104774 A | 2/1998 |
| WO | WO 88/09203 | 12/1988 |
| WO | WO 92/01627 | 2/1992 |
| WO | WO 92/09528 | 6/1992 |
| WO | WO 97/14650 | 4/1997 |

* cited by examiner

*Primary Examiner*—Frank M Lawrence
(74) *Attorney, Agent, or Firm*—Charles D. Gunter, Jr.

(57) ABSTRACT

Powdered lime composition having a BET specific surface area that is equal to or greater than 25 $m^2/g$ and a BJH total pore volume obtained from nitrogen desorption that is equal to or greater than 0.1 $cm^3/g$, and furthermore comprising an alkali metal. The alkali metal content is equal to or greater than 0.2% and equal to or less than 3.5% based on the total weight of the composition. There is also described a method of preparing the composition and use thereof to reduce flue gases.

14 Claims, 2 Drawing Sheets

US 7,744,678 B2

POWDERED LIME COMPOSITION, METHOD OF PREPARING SAME AND USE THEREOF

FIELD OF THE INVENTION

The present invention relates to a powdered hydrated lime composition, to a method of preparing same and to a use of the powdered lime composition to reduce the amount of sulphur-containing and halogen-containing compounds in flue gases.

BACKGROUND OF THE INVENTION

Powdered hydrated lime, also known as slaked lime, is understood to mean a set of solid particles consisting mainly of calcium hydroxide $Ca(OH)_2$.

This slaked lime may obviously contain impurities, such as magnesium oxide or hydroxide, silica, alumina, etc., in a quantity of a few tens of grams per kilo. In general, the particle size of this powdered material is on the whole less than 1 mm and often less than 250 µm. Slaked lime may contain free water, that is to say water that is not chemically bound to the compound, in a quantity of up to around 50 g/kg.

Powdered slaked lime is used in many applications, in particular as a neutralizing agent for acid compounds (HCl, $SO_2$, HF, $SO_3$ ... ) contained in flue gases. In this "dry" method, which is simple and inexpensive, the powdered lime, which is used as an absorbent, is brought into direct contact with the gases to be purified. However, the neutralization reaction between gas and solid is not easy, and a large excess of calcareous reagent with respect to the quantity of acid to be neutralized is often necessary in order to meet increasingly strict emission standards. This excess of reagent poses the problem in particular of additionally generating by-products or residues which have to be treated downstream.

To reduce the excess of reagent or absorbent that has to be used, many products based on powdered slaked lime have been developed in order to obtain a better capability for trapping acid gases using the "dry method".

In particular, it is known to promote the ability of conventional slaked limes to trap gaseous HCl by combining said conventional slaked limes with an additive, such as alkali metal hydroxides or carbonates or alkali metal chlorides [CHEN, D. et coll., International Academic Publishers, 1999, pp. 337-342]. In said document, the additive in question is added to the slaking water for the quicklime during the preparation of the hydrated lime. The authors note an improvement in performance with regard to reducing gaseous HCl for the slaked lime thus obtained, compared to when the additive is absent, at use temperatures above 200° C. On the other hand, no effect in terms of reducing $SO_2$ is mentioned.

Other works, as presented in the U.S. Pat. No. 4,604,269, recommend the addition, to the slaking water for the quicklime, of additives such as sodium hydroxide (NaOH) in a quantity of 5% to 10% by weight, with respect to the quicklime, or alternatively chlorides, such as calcium chloride ($CaCl_2$). The slaked lime thus obtained promotes the removal of sulphur from flue gases at "low" temperature, that is to say less than 230° C., and preferably less than 175° C. This is because the action of the additive appears when the use temperature of the absorbent differs from the dew point by less than 25° C., preferably less than 10° C. Under these conditions, the additive has the effect of making the absorbent deliquescent in the present of moisture, which promotes the presence of a liquid film at the solid/gas interface and improves the trapping of $SO_2$.

The document WO 88/09203 again takes up this concept of adding an alkali metal compound, such as NaOH or chlorides such as $CaCl_2$, to the slaking water for the quicklime. The quantities and the effect of these additives are not really discussed. The first is said to have the aim of increasing the basicity of the absorbent, and the second is said to have the aim of retaining the water, as in the case of U.S. Pat. No. 4,604,269 mentioned above.

The document [Method for producing reactive Coolside sorbent—Production of reactive sorbent for cool-size process—by hydrating quicklime with water containing sodium chloride aqueous solution, Research Disclosure, 1988, 295 (898), No. 29564, ISSN: 03744353], confirms the positive effect on sulphur removal under conditions close to saturation (preferably less than 20° C. above the dew point) of additives such as $Na_2CO_3$, NaOH, $CaCl_2$ and especially NaCl, present in a quantity of more than 5% by weight of the absorbent, by addition to the slaking water. However, the slaked lime thus modified has a BET specific surface area that is less than that of conventional hydrated lime obtained in the absence of additive. Under the use conditions studied, the use of organic additives, such as sugars and surfactants, does not improve the sulphur-removing properties of slaked limes.

In the present text, "first generation" will be used to denote the absorbents of the prior art which are based on slaked lime, the ability of which in respect of trapping acid gases has been improved in comparison with a "conventional" or "standard" slaked lime by adding an additive of the aforementioned type, that is to say a "chemical" modification.

Another class of absorbents based on slaked lime also exists, the ability of which in respect of trapping acid gases is greater than that of a conventional hydrated lime. The advantage of these absorbents then results from a modification of the physical properties, in this case the texture, namely a greater BET specific surface area and/or a greater BJH pore volume. These absorbents will be called "second generation" absorbents, resulting from a "physical" modification, see [OATES, J. A. H., Lime and limestone, Weinheim: Wiley-VCH, 1998, 455, pp. 219-221].

There is known, for example from the document WO97/14650, a powdered lime composition comprising calcium hydroxide particles having a BET specific surface area that is greater than 25 $m^2/g$ and a BJH total pore volume obtained from nitrogen desorption that is at least 0.1 $cm^3/g$.

Said document describes in particular a product based on hydrated lime, the BJH pore volume and the BET specific surface area of which are markedly more developed than those of a standard calcium hydroxide. The ability of such a hydrated lime to trap acid gases is much improved compared to a conventional hydrated lime but also compared to a first-generation slaked lime. The second-generation hydrated lime according to international patent application WO97/14650 is at present considered to be the calcareous reagent with the best performance when it comes to trapping acid gases by the dry method, within a wide range of operating conditions.

However, this second-generation lime does not exhibit such a high increase in the aforementioned trapping performance in respect of all the acid gases that are potentially present in flue gases. In particular, the increase in performance of these second-generation absorbents for reducing the amount of sulphur-containing compounds such as $SO_2$ is not as great as that relating to the reduction in HCl.

SUMMARY OF THE INVENTION

The object of the invention is to overcome the drawbacks of the prior art by providing a powdered hydrated lime composition which has, in addition to excellent HCl-trapping properties, a better ability than second-generation absorbents to trap sulphur-containing compounds.

In order to solve this problem, the invention provides a powdered lime composition comprising calcium hydroxide particles having a BET specific surface area that is equal to or greater than 25 m$^2$/g and a BJH total pore volume obtained from nitrogen desorption that is equal to or greater than 0.1 cm$^3$/g, this composition furthermore having an alkali metal content that is equal to or less than 3.5% based on the total weight of the composition.

Preferably, a powdered composition will be provided which has an alkali metal content that is equal to or greater than 0.2% based on the total weight of the composition.

Due to the presence of an alkali metal in the powdered composition based on slaked lime, said composition exhibits a better SO$_2$-trapping performance than the known second-generation absorbents. Furthermore, this powdered composition retains its excellent properties such as a BET specific surface area and a BJH pore volume which are both high, in particular both being higher than these same properties for a conventional hydrated lime, which means that its ability to trap acid compounds such as HCl is not adversely affected. The presence of the alkali metal results in a powdered lime based on slaked lime that has a modified texture, which contains a quantity of alkali metal of preferably between 2 and 35 g/kg based on the total weight of the composition.

Advantageously, the residual moisture content is equal to or less than 3% by weight, preferably 2.5% and in particular 2%.

Surprisingly, if an alkaline earth metal instead of an alkali metal is used in a quantity of less than or equal to 3.5%, no significant advantage is obtained compared to a second-generation product in terms of the level of SO$_2$ reduction (with Mg(OH)$_2$ and MgSO$_4$), and in some cases even a worsening is observed (with CaCl$_2$). Similarly, if the alkali metal content exceeds 3.5%, the performance is no longer greater than that of a second-generation product.

With particular advantage, the alkali metal originates from an alkali metal compound selected from the group consisting of alkali metal hydroxides, carbonates, hydrogencarbonates, nitrates, phosphates, persulphates and monocarboxylates, such as alkali metal acetates or formiates, and mixtures thereof, in particular those of sodium, potassium and/or lithium.

These alkali metal compounds make it possible to increase the performance in terms of reducing the amount of sulphur-containing compounds, while unexpectedly retaining the increase in performance resulting from the physical improvement in the texture of the product according to the prior art.

Preferably, the composition may have a CO$_2$ content that is equal to or less than 5% by weight, advantageously 3%.

In some embodiments, the calcium hydroxide particles are in the form of a mixture comprising a first fraction of particles having a particle size of less than 32 μm and a second fraction of particles having a particle size of greater than 32 μm, the percentage by weight of particles exceeding 32 μm being between 10 and 50.

With such a particle size distribution, the composition according to the invention has an excellent fluidity and metering ability (accurate and simple), which improve the efficiency of the treatment, in particular the treatment of flue gases.

Furthermore, in some cases, the amount of particles having a particle size of more than 32 μm may be between 20 and 40%.

According to the invention, the BET specific surface area is equal to or greater than 25 m$^2$/g; this means that all values, including 25 m$^2$/g, for example, values greater than 30 m$^2$/g, than 35 m$^2$/g, even up to 45 or 50 m$^2$/g are values for the BET specific surface area which fall within the scope of the invention.

Similarly, the BJH total pore volume obtained from desorption is equal to or greater than 0.1 cm$^3$/g; this means that all values, including 0.1 cm$^3$/g, for example, values greater than 0.15 cm$^3$/g, than 0.17 cm$^3$/g, 0.19 cm$^3$/g and even above 0.20 cm$^3$/g are values for the BJH total pore volume obtained from nitrogen desorption which fall within the scope of the invention.

Other embodiments of the composition according to the invention are indicated in the appended claims.

The powdered composition according to the invention can be prepared by a method comprising
  slaking CaO particles having a particle size that is equal to or less than 10 mm by means of a quantity of slaking water that is sufficient to obtain a calcium hydroxide with a residual moisture of between 15 and 35% by weight, and
  drying said calcium hydroxide to obtain a powdered lime composition.

This method also comprises, before, during and/or after the slaking operation, adding a quantity of an alkali metal compound to the CaO particles, to the slaking water and/or respectively to the calcium hydroxide, this quantity being sufficient to obtain, in said powdered lime composition, an alkali metal content that is equal to or less than 3.5% by weight based on the total weight of the composition.

This method makes it possible to obtain a second-generation absorbent by a method similar to that described in document WO97/14650, that is to say in particular slaking a quicklime in the presence of a considerable excess of water, followed by drying of the excess water, but, in addition, it is provided that an alkali metal compound is added. In this way, a powdered lime based on slaked lime with a modified texture is obtained, which contains an alkali metal. The powdered lime according to the invention has an improved trapping performance in respect of sulphur-containing compounds, while remarkably retaining its performance in respect of acid compounds of the HCl type. Unexpectedly, it was found that this lime also had a good aptitude for trapping HBr and HF.

Advantageously, the drying takes place using a gas at a temperature of between 100 and 550° C., with a reduction in the residual moisture to a value that is equal to or less than 3% by weight.

The alkali metal additive may advantageously be added to the slaking water. This addition to the slaking water may take place prior to the slaking or simultaneously with the latter.

It is also possible to imagine mixing, in the dry state, the alkali metal additive with the calcium oxide particles, before slaking. It is also possible in particular to mix it with the calcium hydroxide obtained after slaking. The additive may also be added at several different times during the process.

In one advantageous embodiment, the alkali metal is preferably sodium, potassium and/or lithium.

With particular preference, the alkali metal compound is selected from the group consisting of alkali metal hydroxides, carbonates, hydrogencarbonates, nitrates, phosphates, persulphates or even monocarboxylic acid salts such as acetates or formiates, or mixtures thereof.

Advantageously, the method according to the invention further comprises, after the slaking, a grinding of at least some of said calcium hydroxide, the grinding taking place after drying and/or during the latter.

The composition according to the invention can also be obtained by a method comprising
- mixing CaO and/or Ca(OH)$_2$ with a quantity of water that is sufficient to obtain a milk of lime with a solids content of 10 to 50% by weight,
- separating water from said milk of lime,
- drying said milk of lime thus separated from water so as to obtain a powdered lime composition, and
- adding, before, during or after the mixing operation, a quantity of an alkali metal compound to the CaO and/or Ca(OH)$_2$, to the mixing water and/or respectively to the milk of lime, this quantity being sufficient to obtain, in said powdered lime composition, an alkali metal content that is equal to or less than 3.5% by weight based on the total weight of the composition.

In some embodiments, the method may advantageously comprise a step of grinding, crushing or deagglomerating the lime-based composition or mixture. Depending on each individual case, the step of separating water (dehydration) is carried out in particular by evaporation, by filtration or by a combination of these two methods.

Other embodiments of the method according to the invention are indicated in the appended claims.

The invention also relates to the use of a powdered lime composition according to the invention for purifying flue gases, in particular for reducing the amount of sulphur-containing and halogen-containing compounds in these flue gases. The sulphur-containing and halogen-containing compounds of the flue gases which are intended to be reduced are in particular $SO_2$, $SO_3$ and HCl, HF and HBr.

Other features, details and advantages of the invention will emerge from the description which is given below by way of non-limiting example and with reference to the appended drawings.

DETAILED DESCRIPTION OF THE INVENTION

In the figures, identical or similar elements are provided with the same references.

In order to make a valid comparison between the compositions according to the invention and the absorbents of the prior art, batches of these different absorbents were prepared on the same pilot plant, using similar operating conditions and starting materials (water and quicklime). This pilot plant for preparing hydrated lime is shown schematically in FIG. 1.

Figure 1:
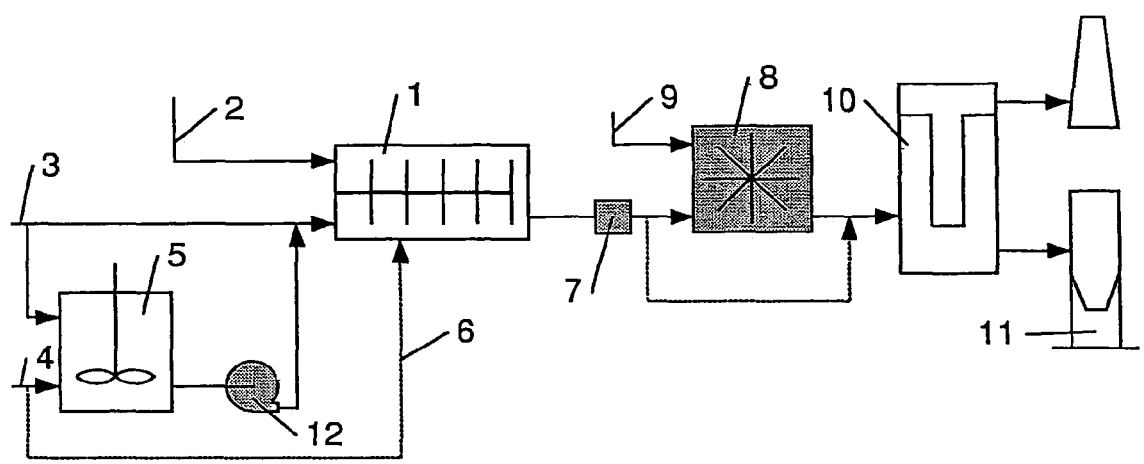
FIG. 1 shows a schematic diagram of a pilot plant for preparing test batches of absorbents.

The device shown in FIG. 1 comprises a single-stage slaking unit, also called a hydrator 1. This single-stage hydrator 1 is fed with ground quicklime via a feed line 2, at a rate of 100 kg/h, and with water via a feed line 3. If an additive is used in the preparation of the absorbent, said additive is fed in via a feed line 4 and it is placed in solution in a reservoir 5, from which it is pumped by means of a pump 12 and added to the slaking water feed line 3 before entering the hydrator 1.

Alternatively, if necessary, the additive can also be added directly to the hydrator 1 by means of a feed line 6.

At the outlet of the hydrator, the moisture content (free water) of the product is continuously measured by an infrared device 7. If this moisture is greater than 20 g/kg, the product is passed into a grinder/dryer 8 which is supplied with hot air via the feed line 9, which makes it possible to deagglomerate and dry the product so as to have a residual moisture that does not exceed 10 g/kg. The end product is then separated from the flow of drying air in a bag filter 10, then directed towards a storage silo 11.

To compare the respective performance of the different absorbents prepared in the aforementioned pilot plant, it appeared necessary to develop a means of testing the absorbents in a suitable manner with regard to reducing the amount of acid gases. For this, in a device shown in FIG. 2, a known flow rate of powdered absorbent is injected in co-current at a given temperature into a stream of synthesis gas, the initial acid composition and flow rate of which are controlled. This device for testing the absorbents approximates as far as possible the conditions of use in industry. It is discriminating in respect of classifying the different absorbents in relative terms, as a function of their respective performance.

Figure 2:
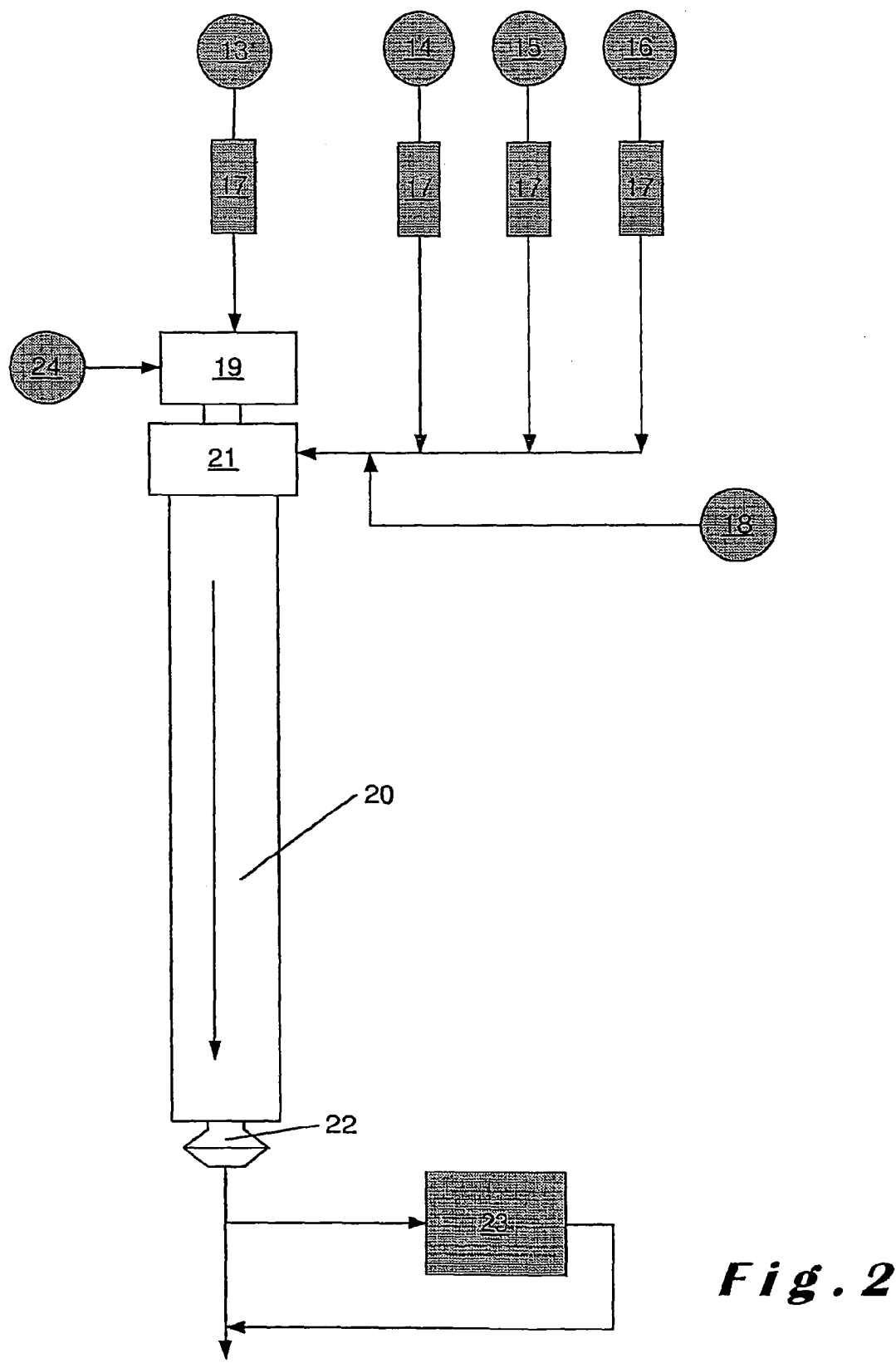
FIG. 2 shows a schematic diagram of the device for testing the absorbents.

As can be seen from FIG. 2, the device for testing the absorbents comprises four gas feed lines 13, 14, 15 and 16, the flow rates of which are controlled by mass flow regulators 17: the first line 13 conveys a mixture of $SO_2$ at 1 mol % in nitrogen, the second line 14 a mixture of HCl 5% in nitrogen, the third line 15 a mixture of $CO_2$ at 15% in nitrogen, and the last line 16 transports nitrogen. A supply of superheated steam 18 also makes it possible to adjust the moisture of the gas streams. The acid gas concentrations are fixed on the basis of the respective flow rates of nitrogen and acid gases. The absorbent is injected at the top of the reactor by means of a powder meter 19, which is supplied with a fraction of the nitrogen stream at 24.

The tubular reactor 20, which has an approximate length of 3 m and an internal diameter of 4 cm, makes it possible to achieve gas/solid contact times of around a few seconds. It is surmounted by a coil 21 for heating the gases to the reaction temperature. This temperature is maintained over the entire length of the reactor by means of heating resistances controlled by a temperature control system.

At the outlet of the reactor, the reaction products are collected on a glass filter 22 and the HCl, $SO_2$ and $CO_2$ concentrations of the gas stream are measured continuously by an infrared analyser 23.

At the start of the experiment, the upstream HCl or $SO_2$ content is determined by the infrared analyser. Once this measured concentration is stable at ±3% of the setpoint value, the absorbent to be tested is injected into the reactor at a given mass flow rate Q, which corresponds to time zero of the experiment. The injection of absorbent is stopped as soon as the downstream HCl or $SO_2$ concentration is stable at ±2% of the asymptotic value, which corresponds to the end time of the experiment.

The sulphur-removing and/or chloride-removing performance of the reagents at a flow rate Q are determined by measuring the final level of removal in percent, that is to say the difference between the HCl or $SO_2$ concentration at time zero of the experiment and the HCl or $SO_2$ concentration at the end time of the experiment, in relation to the HCl or $SO_2$ concentration at time zero of the experiment.

It has been found that, all other things being equal, the same flow rate of first-generation absorbent makes it possible to achieve higher levels of $SO_2$ reduction than a conventional slaked lime. Similarly, the sulphur-removing performance of the second-generation absorbents is always higher than that of first-generation hydrated limes. However, the levels of $SO_2$ reduction obtained are sometimes still insufficient to meet the increasingly strict emission standards, except by using prohibitive quantities of reagent. This is because the use of any excess of absorbent is not only expensive per se but poses the problem of subsequent treatment of high quantities of by-products, after reaction of the absorbent with the acid gas.

In the compositions according to the invention, the alkali metal additive is added in proportions such that the content of the alkali metal which forms the additive is between 2 and 35 g/kg of the final composition, depending on the type of metal and the type of additive in question.

These powdered compositions according to the invention therefore make it possible to combine the imperatives with regard to a high BET specific surface area (>25 m$^2$/g) and a high BJH pore volume (>0.15 cm$^3$/g), while benefiting from an increase in performance in terms of $SO_2$ reduction, this being conferred by the added alkali metal compound.

The use of compositions according to the invention in the device of FIG. 2 shows that there is no significant decrease in performance with regard to HCl reduction, or even an increase therein, compared to a second-generation slaked lime.

The better $SO_2$ reduction performance of the compositions according to the invention make it possible to widen the field of application of the dry method, which is simple and inexpensive, to the purification of flue gases from plants requiring a level of sulphur removal which was previously impossible to achieve by such a method.

The invention will now be described in greater detail by means of non-limiting examples.

EXAMPLES

Example 1

An industrially produced slaked lime is selected as the reference powdered compound (conventional or standard lime). Its BET specific surface area is 18 m$^2$/g and its BJH total pore volume is 0.08 cm$^3$/g.

As in all the cases mentioned in the present document, the BET specific surface area is determined by nitrogen desorption at 77 K, using the well-known multipoint BET method, starting with a sample that has previously been degassed under vacuum using an apparatus of the Micromeritics ASAP 2010 type. The total pore volume is determined using the same apparatus, by nitrogen desorption at 77 K, and is interpreted in accordance with the BJH method (assuming a cylindrical pore geometry).

Furthermore, two first-generation slaked limes are produced in the pilot plant of FIG. 1, starting with a quicklime analogous to the one used to produce the aforementioned reference slaked lime and according to the same method, but in the presence of an additive. The additive is NaOH for the first and $Na_2CO_3$ for the second, in each case added in a quantity such that the end product contains approximately 15 g of additive per kg of absorbent. The lime with added NaOH has a BET specific surface area of 10 m$^2$/g and a BJH total pore volume of 0.05 cm$^3$/g; the lime with added $Na_2CO_3$ has a specific surface area of 9 m$^2$/g and a pore volume of 0.04 cm$^3$/g.

As stated in the aforementioned prior art [Method for producing ( . . . ) ISSN: 03744353], the addition of the additives leads to a reduction in the specific surface area of the first-generation slaked limes compared to the reference. The present example shows that there is also a reduction in the pore volume.

The sulphur-removal performance of the three slaked limes of this example is compared using the device for testing the absorbents which is shown in FIG. 2, under the following operating conditions:

composition of the gas to be purified:

$SO_2$: 1500 mg/Nm$^3$ moisture: 10% by vol.

$CO_2$: 9% by vol.

flow of absorbent: Q stoichiometric ratio (SR): 6.5

The flow of absorbent Q corresponds to the flow of lime that is necessary in order to neutralize the flow of $SO_2$ if the yield of the reaction was 100% (stoichiometric balance), multiplied by a "stoichiometric" ratio (SR), taking account of the fact that some of the injected absorbent does not actually participate in the reaction.

The levels of $SO_2$ reduction obtained with the aforementioned three limes in the device of FIG. 2 are summarized in Table 1 below, as a function of the temperature of the reactor.

TABLE 1

| Temperature ° C. | Level of $SO_2$ reduction | | |
|---|---|---|---|
| | Reference | Lime + NaOH | Lime + $Na_2CO_3$ |
| 150 | 29% | 31% | 33% |
| 200 | 29% | 33% | 34% |
| 240 | 30% | 36% | 35% |
| 350 | 42% | 49% | 54% |

Table 1 shows that the first-generation absorbents have a better sulphur-removal capacity than the reference lime, in the device of FIG. 2.

Example 2

A second-generation slaked lime is produced in the pilot plant of FIG. 1, according to a method analogous to that described in the document WO97/14650, namely slaking of the quicklime in the presence of a large excess of water (residual moisture before drying of 200 to 300 g/kg), followed by drying of the excess water from the end product.

Furthermore, five slaked limes according to the invention are produced in the same plant, starting with a quicklime analogous to the one used to produce the aforementioned second-generation slaked lime and according to a similar method, but in the presence of an additive. The additives are respectively NaOH, $Na_2CO_3$, $Na_3PO_4$, NaCOOH (sodium formiate) and $NaNO_3$, added in a quantity such that the end product contains approximately 7 g of sodium per kg of absorbent.

The sulphur-removal performance of the six slaked limes of Example 2 is evaluated in the same way as in Example 1 and under the same operating conditions, except that the stoichiometric ratio is 2.5 and the temperature is set at 220° C., this temperature being considered to be one of the most discriminating.

The BET specific surface areas and BJH total pore volumes of the five limes of Example 2, as well as their performance in terms of $SO_2$ reduction in the device of FIG. 2 under the aforementioned conditions, are shown in Table 2.

TABLE 2

BET specific surface area, BJH pore volume and level of $SO_2$ reduction

| Absorbent | BET specific surface area [m²/g] | BJH pore volume [cm³/g] | Level of $SO_2$ reduction |
|---|---|---|---|
| 2nd-generation lime according to WO97/14650 | 40 | 0.21 | 20% |
| Lime according to the invention with added NaOH | 36 | 0.21 | 27% |
| Lime according to the invention with added $Na_2CO_3$ | 38 | 0.20 | 29% |
| Lime according to the invention with added $Na_3PO_4$ | 29 | 0.17 | 25% |
| Lime according to the invention with added NaCOOH | 29 | 0.19 | 26% |
| Lime according to the invention with added $NaNO_3$ | 30 | 0.17 | 25% |

The results in Table 2 show that the specific surface area and/or pore volume of the absorbents according to the invention do not in themselves make it possible to predict the performance in terms of $SO_2$ reduction. This is because, with comparable values for these two parameters, the absorbents according to the invention exhibit markedly improved levels of $SO_2$ reduction.

Surprisingly, although the preparation conditions are similar and in particular the sodium contents of the five powdered compositions according to the invention are comparable (approx. 7 g/kg), the specific surface area and pore volume values but also the increase in sulphur-removal performance appear to be different.

Despite a specific surface area and/or pore volume which are sometimes lower, the absorbents according to the invention always exhibit a better sulphur-removal capability than the second-generation lime, in the device of FIG. 2. The latter nevertheless already has a much better sulphur-removal capability than the conventional or first-generation limes.

It should be noted that the absorbents of Example 1 only make it possible to achieve levels of sulphur removal of 6% to 8% under the operating conditions of Example 2 (220° C.-SR=2.5).

Example 3

The performance of the six slaked limes of Example 2 in terms of HCl reduction is evaluated in the test device of FIG. 2, under the operating conditions of Example 2, except that the composition of the gas to be purified comprises 1200 mg/Nm³ of HCl and no $SO_2$.

The BET specific surface areas and BJH total pore volumes of the six limes of Example 2, as well as their performance in terms of HCl reduction in the device of FIG. 2 under the aforementioned conditions, are shown in Table 3.

TABLE 3

BET specific surface area, BJH pore volume and level of HCl reduction

| Absorbent | BET specific surface area [m²/g] | BJH pore volume [cm³/g] | Level of HCl reduction |
|---|---|---|---|
| 2nd-generation lime according to WO97/14650 | 40 | 0.21 | 90% |
| Lime according to the invention with added NaOH | 36 | 0.21 | 88% |
| Lime according to the invention with added $Na_2CO_3$ | 38 | 0.20 | 88% |
| Lime according to the invention with added $Na_3PO_4$ | 29 | 0.17 | 85% |
| Lime according to the invention with added NaCOOH | 29 | 0.19 | 85% |
| Lime according to the invention with added $NaNO_3$ | 30 | 0.17 | 85% |

The results in Table 3 show that the levels of HCl reduction are not or are not greatly affected by the treatment according to the invention, compared to the second-generation product used as reference.

Example 4

A second-generation powdered composition analogous to that of Example 2 and a powdered composition according to the invention, obtained with $Na_2CO_3$ as additive, according to a mode of preparation similar to that of Example 2, are used in an industrial plant which emits $SO_2$.

The main characteristics of the gas to be purified are as follows: gas flow rate: 22,000 Nm³/h, gas moisture: ~15%, $SO_2$: 5000 mg/Nm³ and temperature: 165° C.

The final concentration of $SO_2$ to be achieved is 400 mg/Nm³, which requires a level of $SO_2$ reduction of more than 90%.

The composition according to the invention makes it possible to achieve the set aim of a 90% reduction in $SO_2$ under the aforementioned conditions, with a reduction in absorbent consumption of approx. 15% compared to the other reagent, the second-generation lime. Furthermore, the use of a conventional hydrated lime in the same dosage as the composition according to the invention leads to a level of $SO_2$ reduction of no more than 40%.

Example 5

Powdered compositions analogous to those produced according to the invention are prepared according to a mode of preparation similar to that of Example 2 and starting from a similar quicklime, but obtained with alkaline earth metal additives instead of alkali metal-based additives, added in a similar quantity (approximately 7 g of alkaline earth metal per kg of final composition). Three compositions are prepared, respectively with the alkaline earth metal additives $Mg(OH)_2$, $MgSO_4$ and $CaCl_2$.

The sulphur-removal performance of the three slaked limes of Example 5 is evaluated in the same way as in Example 2 and is compared, like in Example 2, with the performance of the second-generation lime (according to WO97/14650).

The BET specific surface areas and BJH total pore volumes of the three limes of Example 5, as well as their performance in terms of $SO_2$ reduction in the device of FIG. 2 under the aforementioned conditions, are shown in Table 4. This table shows, by way of comparison, the characteristics and performance of the second-generation lime.

TABLE 4

BET specific surface area, BJH pore volume and level of
$SO_2$ reduction of lime with added alkaline earth metals

| Absorbent | BET specific surface area [m²/g] | BJH pore volume [cm³/g] | Level of $SO_2$ reduction |
|---|---|---|---|
| 2nd-generation lime according to WO97/14650 | 40 | 0.21 | 20% |
| Lime with added Mg(OH)₂ | 36 | 0.20 | 18% |
| Lime with added MgSO₄ | 21 | 0.16 | 8% |
| Lime with added CaCl₂ | 12 | 0.09 | 6% |

The results in Table 4 show that the specific surface area and/or pore volume of the absorbents do not in themselves make it possible to predict the performance in terms of $SO_2$ reduction. This is because, with values for these two parameters but especially for the pore volume which are markedly higher than a conventional lime and close to those of a second-generation lime (the production method of which is similar but without the additive), the lime with an alkaline earth metal additive exhibits a level of $SO_2$ reduction which is markedly lower than that of a second-generation lime and is no better than a first-generation lime.

Example 5 very clearly indicates that, unlike the addition of an alkali metal additive according to the invention, the use of a similar quantity of alkaline earth metal additive does not provide any increase in performance in terms of $SO_2$ reduction compared with a second-generation lime, or even completely deteriorates the added lime to the point of exhibiting levels of reduction similar to a first-generation lime or a conventional lime. The experiment shows that this detrimental effect of the alkaline earth metal additive also occurs in the presence of other dosages of the alkaline earth metal additive.

Example 6

Powdered compositions analogous to those produced according to the invention are prepared according to a mode of preparation similar to that of Example 2 and starting from a similar quicklime, but obtained with alkali metal additives added in a quantity greater than that recommended in the invention, in this case approximately 50 g of alkali metal per kg of final composition. Two compositions are prepared, respective with the additives NaOH and Na₂CO₃.

The sulphur-removal performance of the two slaked limes of Example 6 is evaluated in the same way as in Example 2 and is compared, like in Example 2, with the performance of the second-generation lime (according to WO97/14650).

The BET specific surface areas and BJH total pore volumes of the two limes of Example 6, as well as their performance in terms of $SO_2$ reduction in the device of FIG. 2 under the aforementioned conditions, are shown in Table 5. This table shows, by way of comparison, the characteristics and performance of the second-generation lime.

TABLE 5

BET specific surface area, BJH pore volume and level of
$SO_2$ reduction of lime with an added excess of additive

| Absorbent | BET specific surface area [m²/g] | BJH pore volume [cm³/g] | Level of $SO_2$ reduction |
|---|---|---|---|
| 2nd-generation lime according to WO97/14650 | 40 | 0.21 | 20% |
| Lime with an added excess of NaOH (50 g of Na/kg) | 5 | 0.03 | 15% |
| Lime with an added excess of Na₂CO₃ (50 g of Na/kg) | 16 | 0.12 | 13% |

The results in Table 5 show once again that the specific surface area and/or pore volume of the absorbents do not in themselves make it possible to predict the performance in terms of $SO_2$ reduction. This is because, in view of the values for these two parameters, the lime with added NaOH at 5% by weight of Na should have a level of $SO_2$ reduction that is markedly lower than that of the lime with added Na₂CO₃ at 5% by weight of Na.

Furthermore, Table 5 once again shows that the lime with an added excess of alkali metal additive has a performance inferior to that of a second-generation lime.

It must be understood that the present invention is in no way limited to the embodiments described above and that many modifications can be made thereto without departing from the scope of the appended claims.

For example, it is possible to envisage using the powdered lime composition according to the invention for purifying flue gases, after having shaped it for example by extrusion.

The invention claimed is:

1. Powdered lime composition comprising calcium hydroxide particles having a BET specific surface area that is equal to or greater than 25 m²/g and a BJH total pore volume obtained from nitrogen desorption that is equal to or greater than 0.1 cm³/g, characterized in that the composition furthermore has an alkali metal content that is equal to or greater than 0.2% and is equal to or less than 3.5% based on the total weight of the composition.

2. Composition according to claim 1, wherein the powdered lime composition has a residual moisture content, and wherein the residual moisture content is equal to or less than 3% by weight.

3. Composition according to claim 1, characterized in that the alkali metal originates from an alkali metal compound selected from the group consisting of alkali metal hydroxides, carbonates, hydrogencarbonates, nitrates, phosphates, persulphates and monocarboxylates, and mixtures thereof.

4. Composition according to claim 1, characterized in that the alkali metal is selected from the group consisting of sodium, potassium and lithium.

5. Method for preparing a powdered lime composition according to claim 1, comprising:
   slaking CaO particles having a particle size that is equal to or less than 10 mm by means of a quantity of slaking water that is sufficient to obtain a calcium hydroxide with a residual moisture of between 15 and 35% by weight, and
   drying said calcium hydroxide to obtain a powdered lime composition,
   characterized in that the method for preparing a powdered lime composition also comprises, before, during and/or after the slaking operation, adding a quantity of an alkali metal compound to the CaO particles, to the slaking water and/or respectively to the calcium hydroxide, this quantity being sufficient to obtain, in said powdered lime composition, an alkali metal content that is equal to or greater than 0.2% and equal to or less than 3.5% by weight based on the total weight of the composition.

6. Method according to claim 5, in which the addition to the slaking water of said quantity of alkali metal compound takes place prior to said slaking.

7. Method according to claim 5, in which said addition to the slaking water of said quantity of alkali metal compound takes place simultaneously with said slaking.

8. Method according to claim 5, in which the alkali metal compound is selected from the group consisting of alkali metal hydroxides, carbonates, hydrogencarbonates, nitrates, phosphates, persulphates and monocarboxylates, and mixtures thereof.

9. Method according to claim 5, in which the drying takes place using a gas at a temperature of between 100 and 550° C., with a reduction in the residual moisture to a value that is equal to or less than 3% by weight.

10. Method according to claim 5, further comprising, after the slaking, a grinding of at least some of said calcium hydroxide.

11. Method according to claim 10, in which the grinding takes place after drying and/or during drying.

12. Method for preparing a powdered lime composition according to claim 1, comprising:

mixing CaO and/or Ca(OH)$_2$ with a quantity of water that is sufficient to obtain a milk of lime with a solids content of 10 to 50% by weight, separating water from said milk of lime, drying said evaporated milk of lime to obtain a powdered lime composition, and characterized in that the method further comprises the step of:

adding, before, during or after the mixing operation, a quantity of an alkali metal compound to the CaO and/or Ca(OH)$_2$, to the mixing water and/or respectively to the milk of lime, this quantity being sufficient to obtain, in said powdered lime composition, an alkali metal content that is equal to or greater than 0.2% and equal to or less than 3.5% by weight based on the total weight of the composition.

13. Use of a powdered lime composition according to claim 1 for purifying flue gases.

14. Use according to claim 13 for reducing the amount of sulphur-containing and halogen-containing compounds present in said flue gases.

* * * * *